United States Patent [19]

Cummins

[11] Patent Number: 4,917,411

[45] Date of Patent: Apr. 17, 1990

[54] ELECTRONIC STARTING MOTOR CONTROL WITH LOW VOLTAGE PROTECTION

[75] Inventor: Donald L. Cummins, Anderson, Ind.

[73] Assignee: General Motors Corporation, Detroit, Mich.

[21] Appl. No.: 282,765

[22] Filed: Dec. 12, 1988

[51] Int. Cl.[4] ........................ F02N 11/08; H02H 7/08

[52] U.S. Cl. ........................ 290/38 R; 361/33

[58] Field of Search ................. 290/37 R, 38 R, 38 C, 290/38 E, DIG. 1, DIG. 3; 361/29, 33

[56] References Cited

U.S. PATENT DOCUMENTS

| | | | |
|---|---|---|---|
| 2,017,074 | 10/1935 | Prescott | 290/37 R |
| 2,542,712 | 2/1951 | Schneider et al. | 290/38 |
| 3,407,306 | 10/1968 | Huntzinger | 290/38 |
| 3,784,846 | 1/1974 | Krick et al. | 361/33 X |
| 4,171,533 | 10/1979 | Schrader | 361/33 X |
| 4,586,467 | 5/1986 | Raver | 290/38 R X |
| 4,731,543 | 3/1988 | Buetemeister et al. | 290/38 R |

OTHER PUBLICATIONS

Research Disclosure No. 27844, Electric Engine Starter Control System, Jun., 1987.

*Primary Examiner*—M. H. Paschall
*Assistant Examiner*—W. E. Duncanson, Jr.
*Attorney, Agent, or Firm*—C. R. Meland

[57] ABSTRACT

An electronic starting motor control having low voltage protection. The starting motor has a solenoid coil which when energized causes solenoid contacts to be closed to energize the motor and to move a pinion into mesh with the ring gear of an engine to be cranked. A plurality of parallel connected field effect transistors connect and disconnect the solenoid coil to and from system direct voltage. When system voltage is below a predetermined value the field effect transistors are turned off and are maintained turned off until a start switch is opened. The system will not turn off the field effect transistors when short term voltages occur that go below the predetermined value. Various other circuits are disclosed for turning the field effect transistors on and off.

4 Claims, 5 Drawing Sheets

ELECTRONIC STARTING MOTOR CONTROL WITH LOW VOLTAGE PROTECTION

This invention relates to electronic electric starting motor controls and more particularly to an electronic starting motor control system that has low voltage protection.

Electronic cranking motors that use a solenoid for closing solenoid contacts and for moving a pinion into mesh with the ring gear of an engine will operate in an abnormal manner when too low a voltage is applied to the cranking motor. Thus, with too low a system voltage, the solenoid instead of maintaining the solenoid contacts closed and the pinion meshed with the ring gear may cause the contacts to open and close and the pinion to be meshed and then moved out of mesh with the ring gear. This can cause severe arcing damage to the solenoid contacts and damage to the pinion and ring gear. In addition, and of primary concern, low voltage energization of a cranking motor can cause overheating of the cranking motor, damage to cables connecting the batteries and the cranking motor, deep cycling of the batteries (which decreases battery life) and failure of the starter solenoid, due to stuck contacts resulting from rapidly opening and closing the contacts while conducting extremely high current. This is explained in greater detail hereinafter.

The prior art has recognized that low voltage energization of a cranking motor can cause severe arcing of the solenoid contacts. Thus, the U.S. Pat. No. 3,407,306 to Huntzinger points out that low voltage energization of a cranking motor can cause so-called "pumping" of the solenoid with resultant damage to the solenoid contacts. This patent utilizes relays to lockout operation of the cranking motor in the event that the voltage applied to the cranking motor is so low that it cannot maintain the solenoid contacts closed.

This invention differs from the system disclosed in the Huntzinger patent in that, among other things, the system of this invention utilizes semiconductor switch means to control solenoid coil current and it utilizes an electronic circuit to sense the magnitude of the system voltage that is applied to the cranking motor.

It accordingly is an object of this invention to provide a new and improved electronic cranking motor control wherein solenoid coil current is controlled by semiconductor switch means and wherein the semiconductor switch means is biased nonconductive to deenergize or prevent energization of the cranking motor when applied system voltages has a magnitude that is below a predetermined value. In a preferred embodiment of this invention the semiconductor switch means is comprised of a plurality of parallel connected field effect transistors. When system voltage is too low, an electronic circuit, connected to the gates of the field effect transistors, causes the transistors to be turned off thereby opening the circuit to the solneoid coil.

Another object of this invention is to provide an electronic motor control, of the type described, wherein a shut-off circuit is provided that operates when system voltage is too low to cause the opening of the power supply circuit to the solneoid coil and maintain it open until a start-switch is opened.

Still another object of this invention is to provide a low voltage protection circuit for a cranking motor that senses system voltage which includes means for preventing short term voltages that go below the predetermined low level from causing a shut-off circuit to be triggered prematurely.

IN THE DRAWINGS

FIGS. 3*a*–3*d* are circuit diagrams of portions of the total system.

Figure 1:
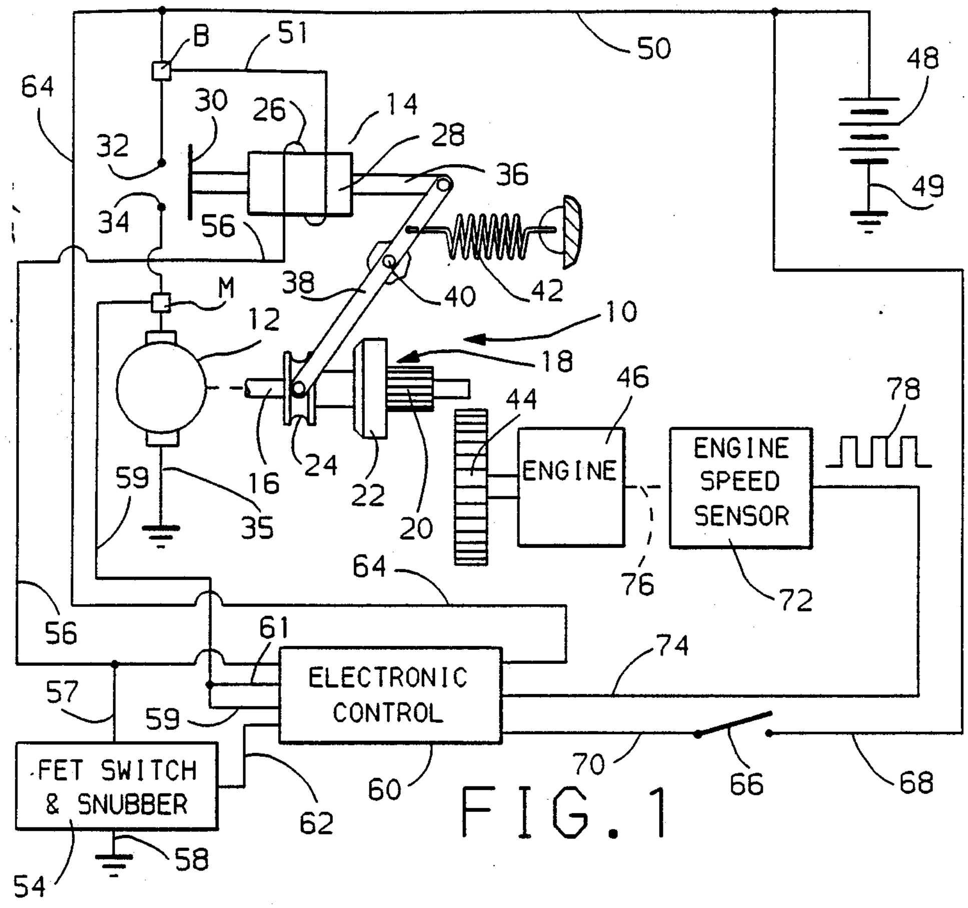
FIG. 1 is a circuit diagram of an electronic motor control.
Figure 2:
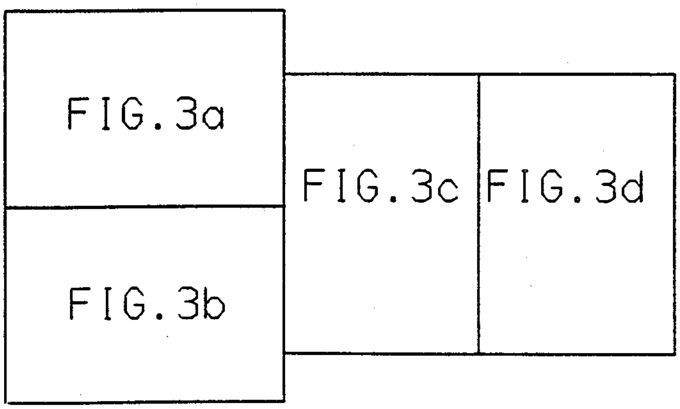
FIG. 2 illustrates the relationship between FIGS. 3*a*–3*d*. When

Referring now to the drawings and more particularly to FIG. 1, the reference numeral 10 generally designates an electric starter which has a cranking motor 12 and a solenoid 14. The cranking motor 12 has a field winding and an armature as is well known to those skilled in the art. The armature shaft of cranking motor 12 is designated by reference numeral 16. The armature shaft 16 carries a starter drive generally designated as 18 that comprises a pinion 20, an over-running clutch 22 and a shift collar 24.

The solenoid 14 has a coil winding 26 and a plunger or armature 28 which is shifted axially when the coil winding is energized. The plunger 28 operates a movable electrical contactor 30 which at times engages fixed electrical contacts 32 and 34.

The plunger 28 of the solenoid is connected to a rod or link 36 which in turn is connected to a pivotally mounted shift lever 38 that pivots about pivot point 40. One end of shift lever 38 is coupled to shift collar 24 so that pivotal movement of shift lever 38 will cause the starter drive 18 and pinion to be shifted axially along shaft 16. When solenoid coil 26 is energized, the plunger 28 is shifted in a direction to cause the contactor 30 to engage fixed contacts 32 and 34. This movement of plunger 28 pivots the shift lever 38 against the force of spring 42 thereby shifting the starter drive to the right in FIG. 1 and in such a direction to cause pinion 20 to mesh with the ring gear 44 of internal combustion engine 46. The starter drive and lever 38 are arranged in a known manner such that contact 30 will not engage fixed contacts 32 and 34 if a pinion block occurs, that is when pinion 20 abuts ring gear 44 so as not to mesh with the ring gear. When no pinion block occurs, that is, when the pinion meshes with the ring gear, contact 30 will engage fixed contacts 32 and 34. When coil 26 is deenergized, the spring 42 moves lever 38 to disengage the pinion 20 from ring gear 44 and to cause contactor 30 to move out of engagement with fixed contacts 32 and 34.

The system illustrated in FIG. 1 includes a 12 volt direct voltage source which takes the form of a 12 volt storage battery 48. The negative side of batter 48 is grounded by conductor 49 and its positive side is connected to conductor 50. Although only one 12 volt battery 48 has been shown and described, it will be appreciated that a plurality of parallel connected 12 volt batteries can be used as the 12 volt direct voltage source. Conductor 50 is connected to fixed solenoid contact 32 through a battery terminal B. Fixed contact 34 is connected to one side of motor 12 through a motor terminal M. The opposite side of motor 12 is grounded through conductor 35.

One side of solenoid coil winding 26 is connected to the positive side of battery 48 via conductor 51. The opposite side of solenoid coil winding 26 is connected to a FET switch and snubber 54 via conductors 56 and 57.

The switch 54 is connected to ground via conductor 58. As will be more fully described, the switch 54 comprises four parallel-connected metal oxide field effect transistors. When these transistors are biased conductive the coil 26 is energized through the conducting transistors.

The FET switch 54 is connected to an electronic control 60 by conductor 62. The electronic control 60 is shown in detail in FIGS. 3*a*–3*d* and will be described. As will be described, the conductor 62 is connected to the gate electrodes of the field effect transistors. The electronic control 60 is connected to the positive side of battery 48 by conductor 64. A start switch 66 is connected between the positive side of the battery and control 60 by conductors 68 and 70.

The electronic control is connected to an engine speed sensor 72 by conductor 74. The engine speed sensor 72 is driven by engine 46 via shaft 76. The speed sensor develops a series of square wave pulses 78 on conductor 74, the frequency of which are a function of engine speed. Engine speed sensors that develop a series of square wave pulses, the frequency of which is a function of engine speed, are well known to those skilled in the art, one example being the speed sensor disclosed in U.S. Pat. No. 4,045,062. The control 60 is connected to terminal M by lines 59 and 61.

The FET switch 54 and the electronic control 60, which are shown in detail in FIGS. 3*a*–3*d* will now be described. The same reference numerals have been used in FIGS. 3*a*–3*d* as were used in FIG. 1 to identify corresponding circuit elements.

Figure 3A:
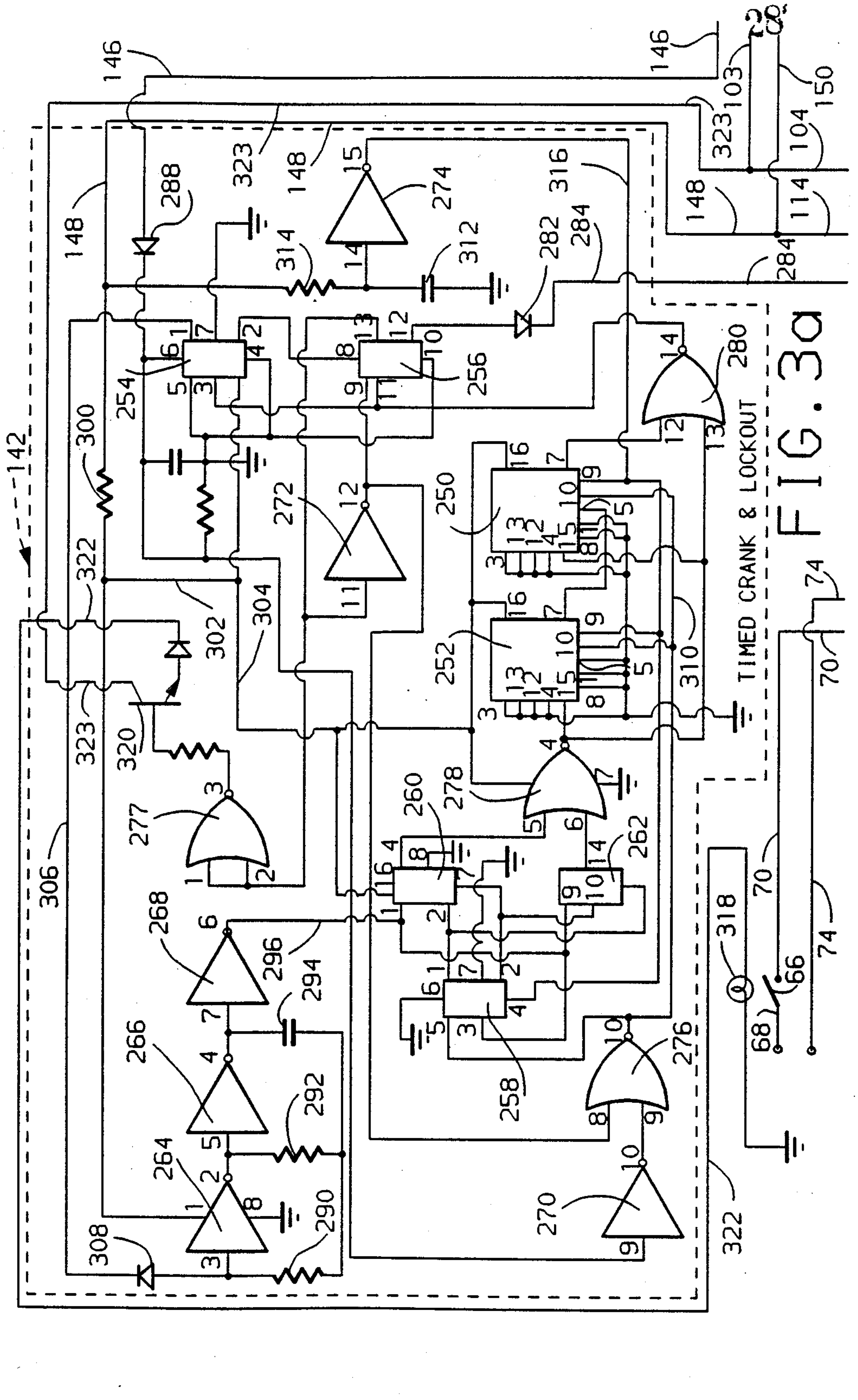
FIGS. 3*a*–3*d* are placed together as shown in FIG. 2, they form a complete interconnect circuit diagram.
Figure 3B:
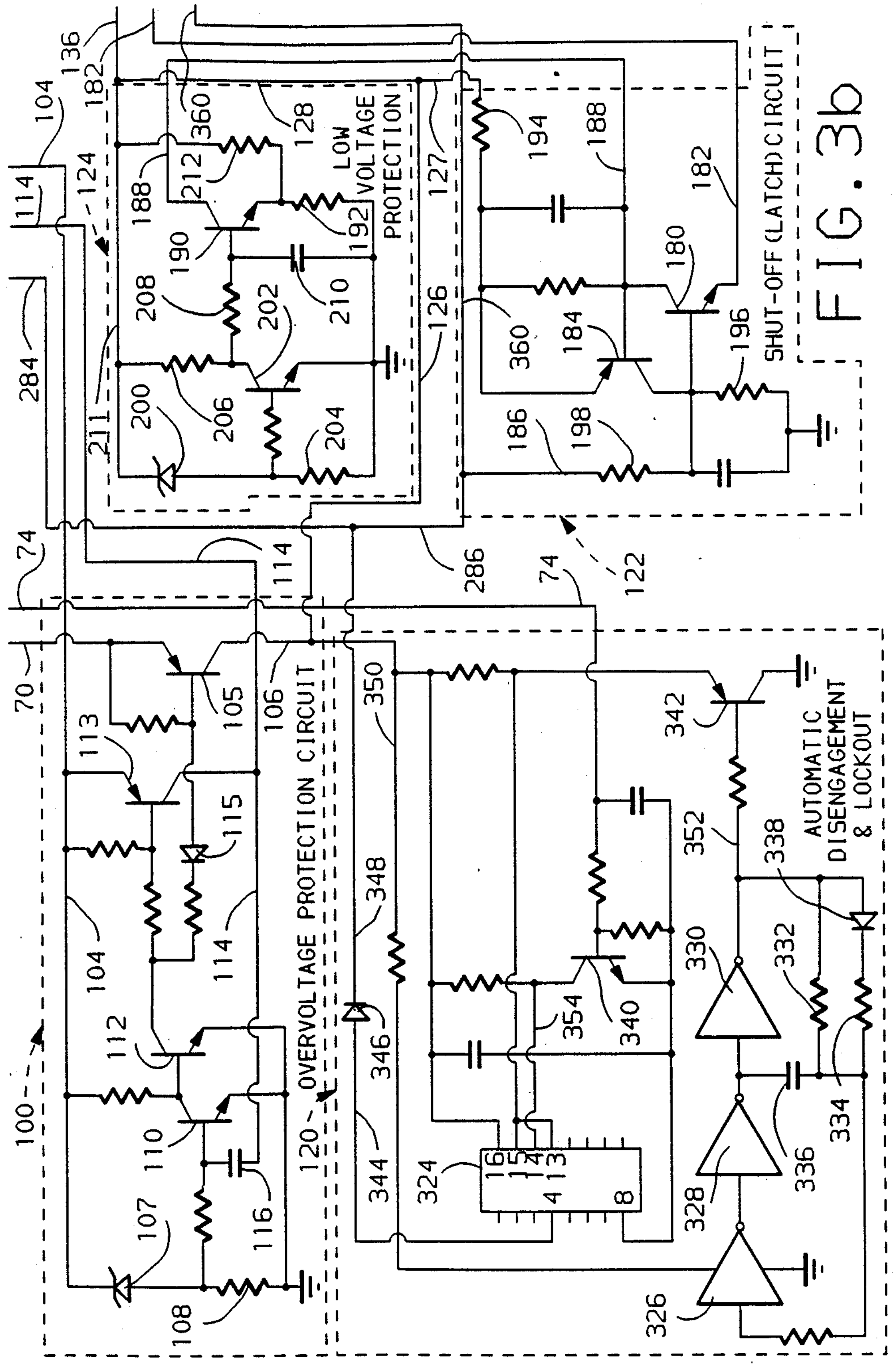
Figure 3C:
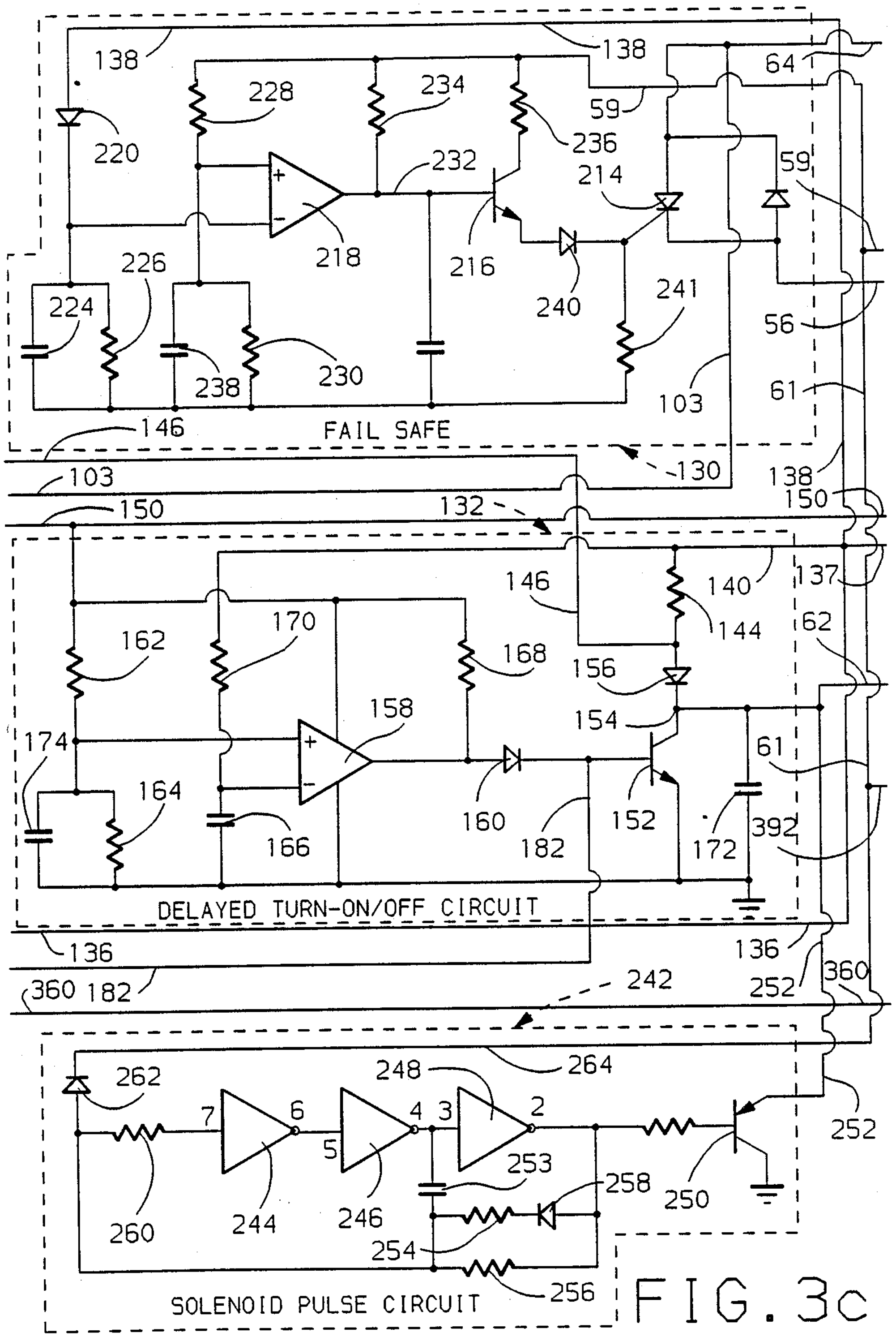
Figure 3D:
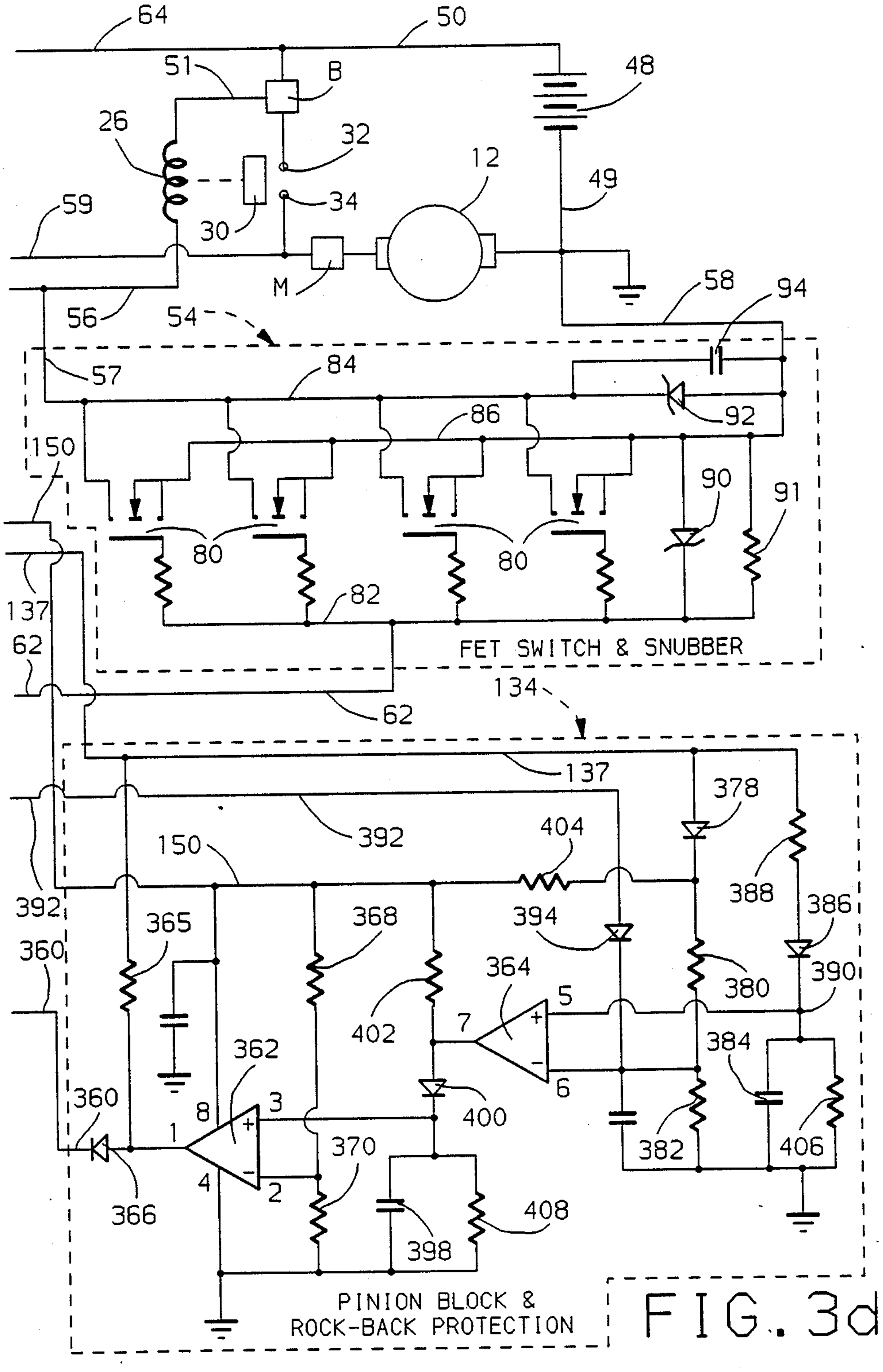

The FET switch and snubber 54, as shown in FIG. 3*d*, includes four parallel connected metal oxide field effect transistors, each designated by reference numeral 80. The transistors 80 are all of the N-channel enhancement mode type and may be, for example, International Rectifier type IRFZ40 field effect transistors. The gate electrodes of transistors 80 are all connected to a conductor 82 through respective resistors. The drain electrodes of transistors 80 are all connected to a conductor 84 which in turn is connected to one side of coil 26 via conductors 56 and 57. The source electrodes of transistors 80 are all connected to conductor 86 which in turn is grounded via conductor 58. It will be apparent that when transistors 80 are biased conductive or turned on, the current through coil 26 will pass through the drain-source circuits of transistors 80 and total coil current will be shared by the parallel connected transistors.

The transistors 80 are all biased conductive by applying a positive voltage to the gate electrodes from conductor 62. When it is desired to bias transistors 80 nonconductive, conductor 62 is connected or clamped to ground.

The circuit 54 has a Zener diode 90, an avalanche diode 92 and a capacitor 94. Zener diode 90 clamps the gate to source voltage of transistors 80 to a safe value. Avalanche diode 92 and capacitor 94 operate as a snubber to protect transistors 80 from excessive voltage transients. High energy transients are clipped by the avalanche diode and higher frequency, low energy transients are suppressed by the capacitor. Circuit 54 has a resistor 91 connected between lines 82 and 86 that may be about 10K ohms. This resistor will discharge capacitor 172 (FIG. 3*c*) to ground when line 62 has no power applied thereto and when it is not clamped to ground.

The electronic control has an over-voltage protection circuit 100 which is shown in FIG. 3*b*. Over-voltage circuit 100 is connected to the positive side of battery 48 via conductors 104 and 103. The purpose of circuit 100 is to prevent energizing the cranking motor 12 with too high a voltage. It is assumed that cranking motor 12 is a twelve volt cranking motor and too high a voltage may be voltages above about 16.8 volts. Thus, for example, if an attempt is made to use 24 volt slave batteries the cranking motor will not be energized. Circuit 100 protects various other circuits that make up control 60 against excessive transient voltages.

Circuit 100 has a PNP output transistor 105. The emitter of this transistor is connected to conductor 70 and to the positive side of battery 48 when start switch 66 is closed. The collector of transistor 105 is connected to conductor 106 which feeds a number of circuits. It will be evident that when transistor 105 is biased conductive and start switch 66 closed, the positive side of battery 48 is connected to line 106. The conductive state of transistor 105 depends upon the voltage between conductor 104 and ground (battery voltage). If this voltage is below about 16.8 volts, transistor 105 is biased conductive. If this voltage is above 16.8 volts, transistor 105 is biased nonconductive. To accomplish this, circuit 100 has a Zener diode 107 and resistor 108 connected across conductor 104 and ground. If the input voltage to the system, between conductor 104 and ground, exceeds 16.8 volts, Zener diode 107 breaks down causing transistor 110 to be biased conductive and in turn causing transistor 112 to be biased nonconductive. Since transistor 112 is nonconductive, transistor 105 and transistor 113 are both biased nonconductive.

It should be noted here that the emitter of transistor 113 is connected to line 104 (battery positive voltage) and its collector is connected to line 114. Line 114 feeds a number of circuits. When transistor 113 is conductive, it connects battery positive voltage to line 114.

When the input voltage to the system is below 16.8 volts, Zener diode 107 does not break down, transistor 110 is nonconductive, transistor 112 is conductive and both transistors 113 and 105 are biased conductive. Positive battery voltage is now applied to line 114 through transistor 113 and if switch 66 is closed, positive battery voltage is applied to line 106 through conducting transistor 105.

It will be appreciated that for battery voltage to be applied to line 106 start switch 66 must be closed. This is not true of the battery voltage that is applied to line 114. The reason for this is that some circuits in the control 60 should have battery voltage only when start switch 66 is closed and other circuits require battery voltage with the start switch open or closed.

In the circuit 100, diode 115 prevents current flow from battery 48 toward the start switch through vehicle loads (not illustrated) connected to line 70 with an over-voltage condition and the start switch open which otherwise could bias transistor 113 conductive. Capacitor 116 provides feedback which accelerates the switching of transistor 110 thereby limiting instantaneous voltages that are applied to the collectors of transistors 105 and 113 to a safe level.

As mentioned, line 106 feeds a number of circuits that will be described. It feeds circuit 120 (FIG. 3*b*) directly through line 106. It feeds circuits 122 (FIG. 3*b*) and 124 (FIG. 3*b*) via lines 126, 127 and 128. It further feeds circuits 130 (FIG. 3*c*), 132 (FIG. 3*c*) and 134 (FIG. 3*d*) via lines 136, 137 and 138. The feed to circuit 132 is through line 140. Further, circuit 142 is fed indirectly via resistor 144 in circuit 132 and line 146.

The line 114 feeds a number of circuits. It feeds circuit 142 (FIG. 3*a*) via line 148 and it feeds circuits 132 (FIG. 3*c*) and 134 (FIG. 3*d*) via line 150.

The circuit 132 (FIG. 3*c*) is a delayed turn-on/off circuit and it will now be described. The purpose of circuit 132 is to provide a time delay from when start switch 66 is closed to when transistors 80 are biased conductive. This allows the lockout circuit 120 (to be described) sufficient time to function when a start is attempted with the engine running. It also prevents start switch "bounce" from effecting logic circuitry used in the electronic control.

Circuit 132 comprises a NPN transistor 152, the emitter of which is grounded. The collector of transistor 152 is connected to junction 154 which in turn is connected to line 62. A diode 156 and resistor 144 are connected between line 140 and junction 154. Circuit 132 has a voltage comparator 158, the output of which is connected to the base of transistor 152 by diode 160.

During a quiescent condition, voltage dividing resistors 162 and 164 establish a reference voltage at the positive input of comparator 158 which is about 60% of battery voltage. The negative input of comparator 158 is now at zero volts. This is true, since capacitor 166 will have discharged through resistors 170 and 144, diode 156 and transistor 152 causing the output of comparator 158 to go high. Battery voltage is also applied across series connected resistor 168, diode 160 and the base to emitter junction of transistor 152 biasing transistor 152 conductive. With transistor 152 conductive, the line 62 is connected to ground to clamp the gates of transistors 80 to ground thereby biasing transistors 80 nonconductive.

Assume now that start switch 66 is closed to initiate engine cranking. The voltage at the negative input of comparator 158 rises as capacitor 166 charges through resistor 170 and when the voltage at the negative input exceeds the voltage of the positive input of the comparator the output of the comparator switches low. This shunts current through resistor 168 to ground with the result that transistor 152 is biased nonconductive. The gate voltage of transistor 80 now rises in a positive direction as capacitor 172 is charged through resistor 144 and diode 156. The transistors 80 are now biased conductive or are turned-on. Capacitor 172 filters the gate to source voltage of transistors 80 and diode 156 blocks discharge of capacitor 172 through circuit 142 (to be described). Capacitor 174 is a filter capacitor.

From what has just been described, circuit 132 provides a time delay between the time that start switch 66 is closed and the point in time that transistors 80 become biased conductive. This time delay is a function of the RC time constant of resistor 170 and capacitor 166 and may be about 150 milliseconds.

Circuit 132 also provides a time delay between the time that start switch 66 is opened and the point in time that transistors 80 become biased nonconductive. When start switch 66 is opened, power is removed from resistor 144 and diode 156. Capacitor 166 now discharges through resistor 170 and various other resistors in the system. As capacitor 166 discharges, the voltage at the negative input of comparator 158 will eventually drop below the voltage at the positive input causing the output of comparator 158 to go high. Transistor 152 is now biased on through resistor 168, diode 160 and the base-emitter circuit of transistor 152. With transistor 152 on, capacitor 172 and the gates of transistors 80 discharge to negative through the collector to emitter of transistor 152 to thereby quickly turn-off transistors 80. Transistors 80 remain turned-off as long as transistor 152 is biased on or conductive.

Circuit 122 (FIG. 3*b*) is a shut-off latch circuit and it will now be described. The purpose of this circuit is to cause transistors 80 to be turned off, disengaging or preventing engagement of the cranking motor when a lockout signal is received from various circuits of the control and to maintain the lockout condition until the start switch 66 is opened. Battery voltage is applied to this circuit via line 127 and resistor 194 when the start switch is closed. No battery voltage is applied to this circuit with the start switch open since with the start switch open the line 126 is disconnected from the battery.

Circuit 122 comprises a NPN transistor 180 and the emitter of this transistor is connected to the base of transistor 152 of circuit 132 by line or conductor 182. When transistor 180 is biased on, transistor 152 of circuit 132 is biased on with the result that transistors 80 are turned or biased off.

Circuit 122 has a PNP transistor 184. The base of transistor 184 is connected to the collector of transistor 180 and the collector of transistor 184 is connected to the base of transistor 180. Circuit 122 can receive a lockout signal on input line 186 from various circuits which will be described. Circuit 122 can receive a lockout signal from the low voltage protection circuit 124 via line 188. Low voltage protection circuit 124 comprises a NPN transistor 190 connected in series with resistor 192. Low voltage circuit 124 will be fully described but in order to describe its relationship to latch circuit 122 it is pointed out that when battery voltage is too low, for example below about 5 volts in a 12 volt system, transistor 190 is biased on or conductive.

Assume now that start switch 66 is closed and a low voltage condition occurs causing transistor 190 to be turned on. With transistor 190 biased on or conductive, the base of transistor 184 is connected to ground through resistor 192. Current now flows from start switch 66 through current limiting resistor 194 and emitter-base of transistor 184. Transistor 184 is now biased on and its collector current passes through resistor 196 to ground.

The current through resistor 196 develops a voltage that is high enough to bias transistor 180 on which in turn causes transistor 152 of circuit 132 to be biased on thereby turning off transistors 80. The circuit will remain in this condition until start switch 66 is opened. Thus, even if transistor 190 of low voltage circuit 124 went nonconductive, the circuit would continue to keep transistors 80 turned off until start switch 66 was opened. The reason for this is that transistors 180 and 184 are connected such that they are latched on once one of the transistors is biased on. Thus, the emitter-base current path for transistor 184 is through the collector-emitter circuit of transistor 180 and the emitter-collector current path of transistor 184 is through the base-emitter circuit of transistor 180.

If a lockout voltage signal is applied to line 186 from various circuits other than low voltage circuit 124, it will apply the voltage across series resistors 198 and 196 to ground. Current through resistor 196 develops sufficient voltage across resistor 196 and the base-emitter of transistor 180 in series with the base-emitter of transistor 152 (circuit 132) to bias transistors 180 and 152 on. With transistor 152 on, transistors 80 are turned off. Transistors 184 and 180 are latched on and accordingly transistors 80 remain biased off until start switch 66 is opened.

In a quiescent condition, that is, with no lockout signal from any source, both transistors 184 and 180 are biased off. In this condition of operation, line 188 will be high, biasing transistor 184 off and line 186 will be low, biasing transistor 180 off.

The unnumbered resistors and capacitors of circuit 122 prevent voltage transients from triggering the circuit.

The low voltage protection circuit 124 (FIG. 3*b*) will now be described. The purpose of this circuit is to disengage or prevent engagement of the cranking motor when system voltage drops below a predetermined low level, for example below about 5 volts when the cranking motor is a 12 volt cranking motor. This prevents damage to the pinion and ring gear and damage to the solenoid contacts due to opening and closing of the contacts and shifting of the pinion both caused by a low voltage energization of the cranking motor. The main reason for circuit 124, however, is to prevent overheating of the cranking motor at lower than normal voltage, prevent possible damage to the connecting cables, prevent deep cycling of the batteries (which decreases life) and to prevent failure of the solenoid due to stuck contacts resulting from rapidly opening and closing while conducting extremely high current.

To further explain the need for the low voltage protection circuit, the following explains what can occur, during various conditions of operation, if no low voltage protection is provided. First of all, assume that battery voltage is lower than required to sustain proper cranking speed. When this happens, the engine will not start. The battery voltage applied to the motor becomes lower if cranking continues and the battery or batteries are deep cycled (decreasing life). Motor current is now higher than normal (less back EMF at low motor speeds) causing the motor to overheat. Both the solenoid contacts and connecting cables are subjected to higher than normal current. As cranking continues, the voltage decreases which further reduces cranking speed which in turn worsens the conditions previously described. If the engine has electronically controlled fuel injectors, the lowering of the voltage may cause fuel to be cut-off. Further, the solenoid contacts will open, disconnecting the motor if the voltage continues dropping to below the level required for the hold-in coil to maintain the solenoid contacts closed. When the contacts open, the motor (and motor load) is removed, permitting the voltage to rise, reclosing the contacts. This cycle repeats rapidly and can result in the contacts welding closed due to repeatedly breaking the higher than normal current.

If the contacts become welded closed, cranking will continue uncontrolled. Cranking speed becomes lower and lower and current higher (motor and cables overheating) and the motor will eventually stall. The batteries are deep cycled and may be damaged and the motor may fail before the batteries discharge.

The low voltage protection circuit 124 comprises Zener diode 200, NPN transistors 190 and 202 resistors 204, 206 and 208 and capacitor 210 all connected as shown in FIG. 3*b*.

When system voltage is normal, that is above the predetermined low level, the battery voltage applied between conductor 211 and ground causes Zener diode 200 to breakdown which permits current to flow through resistor 204. The voltage developed across resistor 204 biases transistor 202 on. Capacitor 210 discharges through resistor 208 and transistor 202 to ground. Since transistor 202 is biased on, transistor 190 is biased off and accordingly no lockout signal is applied to shut-off circuit 122.

Assume now that battery voltage drops below the predetermined low level. Under this condition of operation Zener diode 200 does not breakdown and accordingly transistor 202 is biased off or nonconductive. Capacitor 210 will now charge through resistors 206 and 208. The voltage across capacitor 210 now rises and it eventually attains a level that causes current to flow through the base-emitter of transistor 190 and through resistor 192 to ground. This biases transistor 190 on or conductive which causes a lockout signal to be applied to shut-off circuit 122 via line 188. This in turn causes transistors 80 to shut-off.

The time constant of the RC circuit comprised of resistor 208 and capacitor 210 prevents short term voltages that go below the predetermined low level from triggering shut-off circuit 122 prematurely. Current flow through the voltage divider formed by resistors 212 and 192 establishes a reference voltage for capacitor 210 to charge before transistor 190 is biased on. Resistor 192 also limits current through the emitter-base of transistor 184 of shut-off circuit 122 and through the collector-emitter of transistor 190.

The fail safe circuit (FIG. 3*c*) 130 will now be described. The purpose of this circuit is to prevent continuous energization of cranking motor 12 in the event that one of FETS 80 fails by shorting. The FET may short between drain and gate or between drain and source. If a short occurs between the drain and gate of one of the FETS 80, the other FETS will be biased or turned on between drain and source. A shorted FET drain to source or the turning on of a FET when it should be off would cause coil 26 to be continuously energized with result that the cranking motor would be continuously energized. As will be described, when a shorted FET is sensed, a circuit which bypasses or shorts the solenoid coil 26, is completed so that coil 26 is deenergized. This circuit further causes a high current to flow through FETS 80 thereby purposely overloading the FETS. This causes the internal wire bonds of the FETS to open thereby causing all of the FETS 80 to open to completely open the circuit to solenoid coil 26.

The wire bonds that are opened can be the wire bonds connected to the source of the FETS or could be other wire bonds, bonding pads or source metallization as long as excessive current cause these metallic conductors to open. These wire bonds or metallic conductors operate like a fuse, that is, when excessive current is applied, they are heated to such an extent that they open thereby opening the circuit between the drain and source.

The fail safe circuit 130 comprises a silicon controlled rectifier 214 having its anode connected to line 64 and its cathode connected to line 56. When controlled rectifier 214 is biased conductive or on, battery voltage is applied across the drain-source of FETS 80 causing the wire bonds to open due to the high current through the FETS. With SCR 214 biased on the resistance of the circuit connecting the battery to the FETS is so low that the current through the FETS is high enough to open the wire bonds.

The gate of SCR 214 is connected to the emitter of an NPN transistor 216. The base of transistor 216 is connected to the output of a voltage comparator 218.

The operation of fail safe circuit 130 will now be described. Assume that none of the FETS 80 are shorted and that start switch 66 is closed. With start switch 66 closed near battery voltage (line 138) is applied to the negative input terminal of comparator 218 via diode 220. This voltage is also applied to capacitor 224 and resistor 226. FETS 80 are now turned on, energizing coil 26 to cause contactor 30 to engage contacts 32 and 34. Battery voltage from motor terminal M and line 59 is now applied across series connected resistors 228 and 230. Battery voltage is also applied to line 232 via resistor 234 and to the collector of transistor 216 via resistor 236. The resulting voltage drop across resistor 230 charges capacitor 238 causing the voltage at the positive input terminal of comparator 218 to rise above ground potential but less than that of negative input terminal. Accordingly, comparator 218 remains off (output low) and transistor 216 is biased off. If start switch 66 is now opened (engine may or may not be started) and assuming no FET failure, capacitor 224 will discharge through resistor 226 lowering the voltage at the negative input terminal of comparator 218. The FET$ 80 are turned off, the solenoid contactor 30 opens and the motor is deenergized. The motor terminal M is now substantially at ground potential due to the low resistance path through the motor to ground. Capacitor 238 discharges through resistors 228 and 230 lowering the voltage at the positive input terminal of comparator 218. Capacitor 224 discharges more slowly than capacitor 238, due to different RC time constants, maintaining the voltage at the negative input terminal of comparator 218 higher than the voltage at the positive input terminal, thus maintaining comparator 218 in the off state (output low) until the FETS 80 are turned off to open contactor 30.

Assume now that the start switch 66 is open or is opened from a closed condition and that one or more of the FETS 80 have failed by shorting. With a shorted FET, solenoid coil 26 is energized causing contactor 30 to close and energizing motor 12. With contactor 30 closed, the voltage at motor terminal M is substantially at positive battery voltage. This voltage is applied (via line 59) across resistors 228 and 230, maintaining the positive input terminal of comparator 218 above ground potential. Capacitor 224 discharges, lowering the voltage at the negative input terminal of comparator 218 until less than the voltage at the positive input terminal. This causes the output of comparator 218 to go high. When the output of comparator 218 goes high, transistor 216 is biased on. Current now flows through resistor 236, collector to emitter of transistor 216, diode 240 and resistor 241. The voltage developed across resistor 241 gates SCR 214 conductive which shorts solenoid coil 26 thereby deenergizing coil 26 and opening contactor 30 to deenergize the motor. Since SCR 214 is now on, the drain-source circuits of FETS 80 are connected directly across battery 48 with the result that the wire bonds of the FETS are heated to such an extent that they open.

The following further explains the difference in operation of the fail safe circuit 130 during conditions of operation where there is no failure of a field effect transistor and where a field effect transistor is shorted. With no failure, and with the start switch open, capacitor 238 discharges more slowly than capacitor 224 and the output of comparator 218 remains low. However, with a shorted field effect transistor, the voltage at motor terminal M and conductor 59 is at positive battery voltage and it stays at this voltage because contactor 30 is maintained in a closed condition due to continuous energization of coil 26. Accordingly, the voltage at the positive input of comparator 218 remains above ground potential and as capacitor 224 now discharges, the voltage at the negative input terminal of comparator 218 will go lower than that of the positive input terminal. The output of comparator 218 now goes high, causing SCR 214 to be gated on.

The SCR 214 must have sufficient surge current capacity to open the wire bonds in the time required.

If a system failure occurs, due to contactor 30 being stuck closed after start switch 66 has been opened, the fail safe circuit 130 will be triggered but the good FETS 80 will have been turned off by circuit 132, preventing inadvertent failure of the FETS. Thus, with start switch 66 open and contactor 30 stuck closed the FETS 80 are biased off. The motor, however, will continue to crank the engine until contactor 30 opens, the battery discharges or solenoid coil 26 fails or the motor fails.

In regard to fail safe circuit 130, it will be appreciated that both during normal operation and when a FET is shorted, the voltage at motor terminal M is substantially positive battery voltage. With start switch 66 closed, circuit 130 is not triggered because capacitor 224 cannot discharge. However, once start switch 66 is opened, capacitor 224 can discharge and a shorted FET will now trigger circuit 130.

The electronic control 60 has a solenoid pulse circuit 242, shown in FIG. 3*c*, which will now be described. The purpose of this circuit is to provide pulse-width modulated current to solenoid coil 26 of a frequency and duty cycle that supplies sufficient power to coil 26 to maintain contactor 30 in a closed condition and to maintain pinion 20 meshed with ring gear 44 without overheating coil 26. This permits utilizing a single coil solenoid with no increase in size or cost and no loss of performance or durability.

The solenoid pulse circuit 242 comprises one-half of a HEX inverter having inverters 244, 246 and 248. The other half of the HEX inverter is used in circuit 120 shown in FIG. 3*b* which will be described. The HEX inverter is an RCA CD 4049 HEX inverter. The appropriate pin numbers for this HEX inverter have been used in circuits 242 and 120. The output of inverter 248 is connected to the base of PNP transistor 250. The collector of transistor 250 is grounded and its emitter is connected to line 62 via line 252. Whenever transistor 250 is biased on or conductive, the gates of FETS 80 are connected to ground to turn-off the FETS. When transistor 250 is biased off the FETS are turned on. Accordingly, by biasing transistor 250 alternately on and off a pulse-width modulated current is supplied to solenoid coil 26.

The inverter 248, in conjunction with capacitor 253, resistors 254 and 256 and diode 258, operate as an oscillator having a square-wave output. Capacitor 253 is charged through diode 258 and resistor 254 and through resistor 256. It discharges through resistor 256. Whether capacitor 256 charges or discharges depends upon the output of pin 2. Capacitor 253 charges through a circuit (resistors 254 and 256 in parallel) that has a different resistance than the resistance during discharge (resistor 256). The output of this oscillator is applied to the base of transistor 250 to thereby cause the base voltage to vary such that transistor 250 is biased alternately on and off.

The operation of solenoid pulse circuit 242 will now be described. In a quiescent condition the motor 12 is not energized. The motor terminal M is at ground potential through the low resistance path of motor 12 and various resistors in the circuits of electronic control 60. Terminal 7 of inverter 244 is grounded through resistor 260 and diode 262. This path to ground is through lines 264, 61 and 59 to motor terminal M. Since terminal 7 is grounded, the oscillator is prevented from running. Pins 6, 5 and 2 of the HEX inverter, are at a high potential and pins 4 and 3 are low. Since pin 2 is high, transistor 250 is biased off.

Assume now that start switch 66 is closed. The FETS 80 are now biased or turned on. The oscillator does not oscillate since pin 7 of the HEX inverter is still grounded. When contactor 30 closes, the motor 12 is energized and motor terminal M goes from ground potential to positive battery voltage. This positive voltage is blocked by diode 262. The oscillator now starts running causing the voltage at pin 2 to alternate between high and low at a frequency and duty cycle determined by the values of resistors 254 and 256 and capacitor 253. This causes transistor 250 to be biased on and off which in turn causes FETS 80 to be turned on and off. The frequency and duty cycle of the oscillator are selected such that the pulse-width modulated current supplied to solenoid coil 26 is sufficient to maintain contactor 30 closed and to maintain pinion 20 meshed with ring gear 44 without overheating coil 26. The duty cycle may be about 32%.

When start switch 66 is opened, the FET$ 80 turn off, deenergizing coil 26 and contactor 30 moves to an open position. Motor terminal M now goes to ground potential which grounds terminal 7 of the HEX inverter to cause oscillator to stop running.

In summary, it can be seen that the oscillator is disabled when solenoid contactor 30 is in an open position and is enabled when contactor 30 is in a closed position. Therefore, it will be appreciated that the current to solenoid coil 26 is not pulse width modulated until contactor 30 is closed and this does not occur until pinion 20 meshes with ring gear 44. Accordingly, when start switch 66 is closed, solenoid coil 26 will be continuously energized to supply enough current to coil 26 to develop a magnetic force that is sufficient to move pinion 20 into mesh with ring gear 44 and cause the closure of contactor 30. When contactor 30 closes, the pinion is maintained meshed with the ring gear and the contactor 30 is maintained closed by the pulses of current supplied to coil 26.

The timed crank and lockout circuit 142 (FIG. 3*a*) will now be described. The purpose of this circuit is to prevent overheating of the solenoid coil 26 and cranking motor 12 by limiting cranking time to a predetermined time limit, with automatic disengageent and a forced cool down (lockout) time period when the cranking time has been exceeded. As will become apparent, repeated crank cycles are possible, without lockout, until the total crank time limit is reached. This total crank time limit may be about 30 seconds and the forced cool down period is about four times as long as the crank limit time (120 seconds). The crank time limit is increased, for example, by $\frac{1}{4}$ of the time between cranks until the limit is reached. The lockout time (120 seconds) remains the same, regardless of the number of crank cycles prior to lockout and crank attempts during lockout are ignored. The circuit will turn off automatically at a time interval equal to about four times the preceding crank cycle. The circuit will automatically reset when the battery is disconnected and then reconnected.

As will be more fully explained, circuit 142 has counting means for up counting and down counting constant frequency clock pulses. Further, in one mode of operation, where the start switch 66 is repeatedly open and closed, the system counts up with the switch closed and counts down when the switch is open. Circuit 142 receives information regarding the open or closed status of switch 66 via conductor 146. This conductor is connected to the junction between diode 156 and resistor 144 of turn on circuit 132 (FIG. 3*c*). With the start switch closed, the voltage on conductor 146 goes high and with the start switch open it goes low.

In the following description of circuit 142 some of the circuit elements will be designated by manufacturer's name and type and when this is done, the circuit elements, as shown in FIG. 3*a,* includes appropriate pin numbers. Circuit 142 has two up-down counters 250 and 252 which are Motorola MC 14516 BAL up-down counters. Circuit 142 further has three D flip-flops 254, 256 and 258 which are Motorola MC 14013 BAL D flip-flops. Flip-flops 254 and 256 are part of the same package, that is, they are dual D flip-flops. Flip-flop 258 is one-half of a dual D flip-flop package. Circuit elements 260 and 262 are binary counter-dividers and are Motorola MC 14020 BAL counter-dividers. The circuit 142 uses a Motorola MC 14049 BAL HEX inverter comprised of inverter sections or portions 264, 266, 268, 270, 272 and 274. Circuit 142 further includes NOR gates 276, 277, 278 and 280 which are Motorola MC 14001 BAL 2-input NOR gates. The NOR gates are in one quad package, that is, the package has four NOR gates.

The shut-off circuit 122 is connected to pin 12 of flip-flop 256 by diode 282 and lines 284, 286 and 186. Circuit 142 is further connected to turn on-off circuit 132 by line 146 and diode 288. When a shut-off signal is developed on line 284, the shut-off circuit 122 (FIG. 3*b*) is actuated to shut-off the cranking motor. Shut-off occurs when pin 10 $\overline{Q}$ output of flip-flop 256 goes from low to high.

Inverters 264, 266 and 268 together with resistors 290 and 292 and capacitor 294 form a square wave oscillator or clock pulse source which develops clock pulses that are applied to line 296. The frequency of the clock pulses may be about 35.7 HZ where the crank limit is 30 seconds and where a two minute (120 seconds) lockout is desired.

The operation of the timed crank circuit will now be described.

When start switch 66 is closed, to initiate cranking, the oscillator is energized via line 148 and resistor 300. Further, battery voltage is applied to lines 302 and 304 and hence to pin 14 of flip-flop 254. This flip-flop is now set by the signal on line 146 (high) with its Q output high (pin 1) and this transition causes the oscillator to run via line 306 and diode 308. The flip-flop 254 operates as an oscillator control, that is, it can start or terminate operation of the oscillator.

The NOR gate 276 operates as an up-down counter control, that is, it causes counters 250 and 252 to count either up or down. Since the inputs to this NOR gate are both now low its output is high. This high output is applied to pin 10 of up-down counters 252 and 250 via line 310 setting both counters for up counting.

The flip-flop 258 is a frequency control. The frequency dividers 260 and 262 are actuated by flip-flip 258 such that during up-counting, one output pulse is developed for each four input clock pulses (divide by four) and during down-counting, one output pulse is developed for each sixteen input clock pulses (divide by sixteen). Divider 260 is the divide by four divider and divider 262 is the divide by sixteen. At the initiation of cranking, flip-flop 258 actuates divider 260 so that up-counting will occur with clock pulses that are divided by four. Gate 278 now transmits the output of divider 260 to the clock inputs (pin 15) of counters 252 and 250 and to the input of gate 280. Counters 252 and 250 can now count-up. When counter 252 attains a certain count level, a signal is developed at pin 7 (carry out) that applied to pin 5 (carry in) of counter 250 to toggle this counter. Counter 250 now counts up and if it is permitted to continue to count up, it times out or attains a certain count magnitude. When counter 250 times out, a signal transition occurs at pin 7 of counter 250. The counters 250 and 252 operate as a timer. Thus, clock pulses of constant frequency and divided by four are applied to the counters 250 and 252 during up counting. If continuous up counting occurs, counter 250 will time out 30 seconds after up counting started to terminate cranking. As mentioned, down counting occurs by means of the divide by sixteen divider 262. When counter 250 has been counted up to a magnitude where it times out, and then counters 250 and 252 are continuously counted down, a signal transition is developed at pin 7 of counter 250 when the number of down-counting pulses that occurs corresponds to 120 seconds. Putting it another way, it takes 120 seconds for the counters to be down counted once they have been up counted for a period of time corresponding to thirty seconds.

As will be more fully described, if cranking occurs continuously for 30 seconds, the counter 250 will time out and a shut-off signal will be developed to terminate energization of the cranking motor. When this occurs, cranking cannot again occur until 120 seconds after cranking was locked out. This 120 second period corresponds to the time it takes to down count the counters. If the operator attempts to initiate cranking by closing start switch 66, no energization of the cranking motor will occur until the 120 second time period has elapsed. This 120 second time period allows the motor to cool down.

It is possible that the operator may close and open start switch repeatedly and such that the start switch is never continuously closed for 30 seconds. This causes intermittent energization of the cranking motor. The system operates such that during intermittent energization a shut-off signal will be developed if the total of the intermittent energization periods is equal to 30 seconds plus one-fourth of elapsed time periods between cranking motor energization. Thus, when the start switch is closed, the counters count up and when the start switch is opened they count down at one-fourth of the count-up rate. The counters must attain a certain count magnitude before a shut-off signal is developed, and by repeatedly opening and closing the start switch the counters count up when the switch is closed and count down at a lower rate when the switch is opened. To further explain this, and keeping in mind that down counting takes place at one-fourth of the rate of up counting, let it be assumed that the operator closes the start switch for 10 seconds, then opens the start switch for 10 seconds and repeats this sequence for a period of time. When the start switch is closed for 10 seconds, the counters count up for 10 seconds. When the start switch is now opened, the counters count down for 10 seconds. However, due to the lower count down rate, and insofar as the count magnitude in the counters is concerned, this magnitude is reduced by 2.5 seconds (one-fourth of 10) to a corresponding count magnitude in the counters of 7.5 seconds. Another closure of the start switch for 10 seconds causes up counting to a count magnitude corresponding to 17.5 seconds (7.5+10). Opening the switch for 10 seconds reduces the count magnitude to fifteen seconds (17.5−2.5). Closing the switch for ten seconds increases the count magnitude to twenty-five seconds (15+10). Opening the switch for 10 seconds reduces the count magnitude to 22.5 seconds (25−2.5). When the switch is now closed, a shut off signal will be developed in 7.5 seconds (22.5+7.5) since the counters will now contain a count magnitude corresponding to thirty seconds. The sum of the time periods that the motor was energized is equal to 37.5 seconds. Thus, the motor was energized for the 30 second period plus one-fourth of the sum of the time periods that the start switch was open. Since the start switch was open for three consecutive time periods of 10 seconds for a total of 30 seconds, the time period added to the 30 second time period is one-fourth of 30 or 7.5 seconds. It will be appreciated that as the periods of time that the start switch is closed decreases, the total time period that is added to the 30 second time period decreases and vice-versa.

Let it now be assumed that start switch 66 was closed to cause counters 252 and 250 to count-up and was subsequently opened before counter 250 times out. Since counter 250 did not time out, no signal transition occurs at its pin 7 and, accordingly, there is no clock pulse to flip-flops 256 and 254. Due to opening of the start switch 66, the up-down control NOR gate 276 now sets counters 250 and 252 for down-counting and causes divider 260 to be deactivated and divider 262 (divide by 16) to be activated. The counters are now down-counted at a lower frequency. Gate 278 transmits the output of divider 262 to the clock inputs of counters 252 and 250 and to the input of gate 280. As down-counting proceeds, the carry out of counter 252 toggles counter 250 (carry in). Counter 250 times out and carry out to gate 280 (pin 12) switches low. The next low input to gate 280 (pin 13) from gate 278 causes gate 280 output (pin 14) to switch high. Flip-flops 254 and 256 are both clocked, causing D inputs (both low) to be transferred to the Q outputs. The Q output (pin 1) of flip-flop 254 goes low, switching the oscillator off. The Q output (pin 13) of flip-flop 256 now switches low and the $\overline{Q}$ output (pin 12) switches high thereby developing a lockout or shut-off signal. This lockout signal does not trigger shut-off circuit 122 because start switch 66 is open and, accordingly, battery voltage is not applied to line 127. The $\overline{Q}$ output of 254 and the set (pin 8) of 256 switch high, setting 256 back to $\overline{Q}$ low (no lockout) and Q high. The circuit now returns to a quiescent condition.

In the mode of operation that has just been described, the time period that the cranking motor was energized did not exceed 30 seconds and, accordingly, operation of the cranking motor was not locked out. Further, circuit 142 was turned off after counters 252 and 250 counted down, that is, the oscillator was shut-off. Oscillator shut-off occurs at four times of the time period that the counters were counted up.

The mode of operation in which the start switch is repeatedly open and closed will now be further described. In this mode of operation the counters count-up when the start switch is closed, and they count down when the start switch is open. This causes the count in the counters to consecutively increase and decrease as the switch is closed and opened. The down-counting as explained is at a rate of one-fourth of the up-counting. It is assumed that in this sequence of closing and opening the start switch the time that the switch is open was not long enough to cause a complete count-down or, in other words, counter 250 does not time out during down counting. The counters will now alternately up-count and down count until the counters have a count magnitude that corresponds to thirty seconds. When this count magnitude is attained, counter 250 times out during a period of up-counting causing a lockout signal to be developed on line 284 that is applied to shut-off circuit 122 which in turn locks out operation of the cranking motor. The cranking motor cannot again be energized for 120 seconds. Thus, closure of the start switch 66 will not result in energizing the cranking motor because line 284 will remain high for 120 seconds.

In regard to the 120 second lockout time, it will be appreciated that once the counters have attained a count corresponding to 30 seconds, it will take 120 seconds to completely count the counters down to where counter 250 times out. This is because the count-down rate is one-fourth of the count-up ratio.

To further explain the operation of circuit 142 it will be appreciated that when counter 250 times out, pin 7 will switch low. The next low cycle from gate 278 results in both inputs of gate 280 being low, which causes its output to switch high. Flip-flops 254 and 256 are now both clocked. Flip-flop 254 does not change state since set (pin 6) is still high (start switch closed) and the oscillator continues to run. The D input (low) of 256 is clocked to Q output and $\overline{Q}$ output is switched high resulting in a pulse applied to shut-off circuit 122 via diode 282 and lines 284, 286 and 186. This actuates shut-off circuit 122 to cause the operation of the cranking motor to be locked-out. The Q output of 256 (low) switches the D input high though inverter 272. Up-down control 278 switches counters 252 and 250 to a down-count mode and frequency control 258 actuates 262 for down counting at a lower frequency. The down-counting continues for 120 seconds, as previously explained, except that the D input of 256 is high. This input (high) is clocked to the Q output of 256. The $\overline{Q}$ output of 256 is switched low which removes the lockout signal.

If the start switch is opened when 254 is clocked, its D input is transferred to its Q output, causing the oscillator to stop running and the circuit returns to a quiescent condition.

If the start switch is closed when 254 is clocked, the S (Set) input is high, causing Q output to remain high and the oscillator continues to run, permitting a new crank cycle.

In the event that the battery is disconnected and then reconnected circuit 142 is reset. When the battery is disconnected, capacitor 312 discharges and both pins 14 and 15 of inverter 274 are low. When the battery is reconnected, power is restored to inverter 274 and pin 15 immediately goes high since capacitor 312 is discharged and pin 14 is low. Capacitor 312 charges through resistor 314 until pin 14 of inverter 273 becomes sufficiently high to switch pin 15 low. The high output of inverter 274, during charging of capacitor 312, resets frequency control 258 and counters 252 and 250 via line 316. The circuit is now in a quiescent condition, ready to crank.

A lockout condition can be indicated to the vehicle operator by lamp 318. When lockout occurs, flip-flop 256 changes condition with a low on pin 13. The inputs of gate 277 are now both low and its output is high. This biases NPN transistor 320 on which energizes lamp 318 via line 322. In this regard the collector of transistor 320 is connected to battery voltage via line 323. The lamp will be on during the crank cycle (lamp check) but will not affect the ability to crank unless lockout has occurred in which case the cranking motor will not engage and lamp 318 will remain on until the lockout time expires even though the start switch is opened.

The automatic disengagement and lockout circuit 120 (FIG. 3*b*) will now be described. The purpose of this circuit is to disengage and lockout operation of the cranking motor when the engine starts and to lockout operation of the cranking motor when the engine is running.

The circuit 120 comprises an RCA CD 4017 counter designated as 324. The circuit further comprises a square-wave oscillator or clock pulse source that is made up of inverters 326, 328 and 330. The other half of this HEX inverter is used in circuit 242 which has been described. The circuit 120 further has resistors 332 and 334, capacitor 336 and diode 338. These circuit elements operate in the same manner as the corresponding circuit elements used in circuit 242. Circuit 120 further comprises a NPN transistor 340 and a PNP transistor 342. Pin 4 of counter 324 is connected to shut-off circuit 122 via line 344, diode 346, line 348, line 286 and line 186. Circuit 120 receives voltage from circuit 100 via lines 106 and 350.

The output signal developed by speed sensor 72 is applied to circuit 120 by line 74. This applies a square-wave signal having a frequency such that about twelve pulses per engine revolution are applied to line 74. When this signal goes low, transistor 340 is biased off and when it goes high, transistor 340 is biased on. The switching of transistor 340, in effect, develops clock pulses that are applied to pin 14 of counter 324 via line 354 so that when counter 324 is not inhibited from counting it counts-up clock pulses developed by the switching of transistor 340.

The square wave output of the oscillator is applied to the base of transistor 342 by line 352 and, accordingly, transistor 342 switches on and off at the frequency of the oscillator. When the osciator output is low, transistor 342 is biased on and when it is high, transistor 342 is biased off. The square wave output signal of the oscillator is such that the time period that it is low is longer than the time period that it is high. The output frequency of the oscillator is constant so that the low time periods are all the same and of a constant time duration. Each time transistor 342 is biased on, pins 13 and 15 are grounded which sets the counter 324 to a condition to begin up counting. When transistor 342 is biased off, the count attained by counter 324 is reset to zero and up-counting of counter 324 is inhibited. Thus, the only time that counter 324 can count-up from zero is during the periods of time that the oscillator output signal on line 352 is low.

With the foregoing in mind, it will be appreciated that counter 324 counts-up the speed signal pulses on line 74 for fixed periods of time. The frequency of the speed signal pulses is directly proportional to engine speed.

When engine speed exceeds a predetermined value the counter 324 will have counted a number of speed signal pulses that is sufficient to cause counter 324 to reach a certain count magnitude or, in other words, time out. When this happens, a signal is developed at pin 4 of counter 324 which is applied to shut-off circuit 122 which disengages the cranking motor. The speed at which disengagement occurs corresponds to an engine speed when the engine is started.

It will be appreciated that the constant duration low periods produced by the oscillator, which biases transistor 342 conductive, in effect develops a window having a constant time duration. When this window is developed, a certain number of engine speed related clock pulses are counted during the duration of the window. If engine speed is high enough, the number of speed dependent clock pulses that are counted during the duration of the window will be high enough to develop a cranking motor lockout signal.

If the start switch is closed while the engine is running at idle speed or above, the frequency of the speed signal pulses applied to line 74 remains high enough to cause counter 324 to time out and apply a lockout signal to the shut-off circuit in less time than is required to energize solenoid coil 26, thus preventing engagement of the cranking motor while the engine is running. It should be noted, in regard to this, that delayed turn-on circuit 132 provides some delay between closing of the start switch and energization of the cranking motor. This delay assures lockout when the engine is running and an attempt is made to energize the cranking motor by closing the start switch.

The speed at which disengagement occurs can be varied by changing the values of resistors 332 and 334 and/or the capacitance of capacitor 336 since these circuit elements set the duty cycle and frequency of the oscillator.

The pinion block and rock-back protection circuit 134 (shown in FIG. 3*d*) will now be described. The purpose of this circuit is to automatically disengage the cranking motor when pinion blocks occur, that is when the pinion 20 abuts the end of the ring gear 44 of the engine so that the pinion does not mesh with the ring gear. Further, this circuit provides a time delay between successive cranks to prevent engaging the cranking motor during engine rock-back. This circuit also prevents solenoid contact chatter and prevents the operator from "jogging" the engine, using the cranking motor.

Circuit 134 is connected to over-voltage protection circuit 100 and is connected to shut-off circuit 122 via line 360.

The circuit 134 comprises voltage comparators 362 and 364 which is formed by a Motorola LM 193 dual comparator. The output of comparator 362 is connected to the anode of diode 366. Resistors 368 and 370 form a voltage divider to provide a reference voltage that is applied to the negative input terminal of comparator 362.

Assume that start switch 66 is closed after being open for three seconds or more. The voltage at the negative input terminal of comparator 364 will be battery voltage less the drop across diode 378 and the voltage drop caused by voltage divider resistors 380 and 382. Resistor 380 may be about 68K and resistor 382 about 100K. Capacitor 384 now charges through diode 386 and resistor 388 causing the voltage at junction 390 to rise. The output of comparator 364 is now low. The relative voltages applied to the inputs of comparator 362 are now such that the output of comparator 362 is low and no lockout signal is developed. Solenoid coil 26 is energized and, assuming no pinion block, solenoid contactor 30 closes. When contactor 30 closes, the voltage at motor terminal M now rises to battery voltage and this voltage is applied to the negative input terminal of comparator 364 via lines 59 and 61, line 392 and diode 394. Capacitor 384 charges to a maximum that is less than the voltage applied to the negative input terminal of comparator 364 and accordingly the output of 364 remains low. The voltage at the positive input of comparator 362 remains low and is less than the negative input maintaining the output of comparator 362 low and consequently no lockout signal is developed. There will be no disengagement of the starter until the start switch is opened.

Assume now that the start switch has been closed and solenoid 26 energized and that a pinion block occurs, that is, the pinion 20 abuts the ring gear 44 to prevent the pinion from meshing with the ring gear. Because of this pinion block, contactor 30 cannot move to a closed position and accordingly motor terminal M will be at ground potential or low instead of being near battery voltage which is the case when contactor 30 is allowed to close. Now as capacitor 384 charges, the voltage at the positive input of comparator 364 will eventually exceed the voltage at its negative input and the output of comparator 364 now switches high. Capacitor 398 now charges rapidly through diode 400 and resistor 402. The voltage at the positive input of comparator 362 now rises above the voltage at its negative input with the result that the output of comparator 362 goes high which provides a lockout signal to shut-off circuit 122. This lockout signal is from line 137, through resistor 365, and then through diode 366 to line 360. This disengages the cranking motor. The lockout signal can be developed at about 600 milliseconds after the start switch is closed. This time period can be varied by changing the value of capacitor 384 and/or resistor 388. If 388 is changed, resistor 406 must also be changed to maintain proper voltage divider ratios.

It will be appreciated that the voltage of pin 6 of comparator 364 varies dependent upon whether contactor 30 is open or closed. With contactor 30 open, pin 6 has a voltage determined by the voltage divider ratio of resistors 380 and 384. When contactor 30 is closed, the voltage of pin 6 is increased to battery voltage less the small drop across diode 394. When the start switch is closed to cause contactor 30 to close, the voltage attained by capacitor 384 and applied to pin 5 never gets as high as the voltage applied to pin 6 when contactor 30 closes. On the other hand, if a pinion block occurs, contactor 30 remains open and the voltage at pin 6 does not increase to near battery voltage. In that case, capacitor 384 is charged to such a voltage that the voltage of pin 5 exceeds the voltage of pin 6 and the output of comparator 364 goes high to in turn lockout operation of the cranking motor.

When the start switch is opened after normal pinion engagement or after a pinion block, the solenoid coil 26 is deenergized and contactor 30 opens. The M terminal voltage now goes to ground. The voltage at the negative input terminal of comparator 364 is now a function of the resistance values of resistors 404, 380 and 382, since these resistors are now energized from line 150. Resistor 404 may be about 100K ohms. The voltage at pin 6 of comparator 364 is now lower than it was when it was supplied from line 137 and resistors 380 and 382, which occurs with the start switch closed. Capacitor 384 starts discharging through resistor 406, reducing the voltage at the positive input of comparator 364. The voltage at the output of comparator 364 stays high (after a pinion block) or switches high (after a normal pinion engagement). Capacitor 398 charges to battery voltage minus the voltage drop across diode 400 and resistor 402 from line 150. The output of comparator 362 switches high but the potential at the anode of diode 366 remains low with the start switch open since there is no voltage on line 137 with the start switch open and, accordingly, no voltage is applied to diode 366 through resistor 365. Capacitor 384 now discharges through resistor 406 and eventually the positive input of comparator 364 becomes less than its negative input and the output of comparator 364 switches low. Capacitor 398 discharges through resistor 408 and the voltage at the positive input (pin 3) of comparator 362 decreases.

Assume now that the start switch was immediately re-closed with less than a preceding two second open period. The voltage at pin 5 of comparator 364 is still higher than the voltage at pin 6 and pin 7 is high. The voltage at pin 3 of comparator 362 exceeds the voltage of pin 2, and pin 1 goes high sending a pulse to the shut-off circuit 122 to prevent engagement. The delay between cranks prevents the operator from "jogging" the engine, using the cranking motor, and prevents engaging the motor during engine rock back.

The following is a further explanation of how circuit 134 develops a shut-off pulse in the event that start switch is opened and then reclosed where the start switch is not maintained in an open condition for a predetermined time period of about two seconds. If the two second time period has not expired, the voltage at junction 390 and pin 5 of comparator 364, with the start switch closed, will be higher than the pin 6 voltage causing comparator 364 to switch high. This causes the output of comparator 362 to switch high thereby developing a shut-off pulse on line 360. The delay time of about two seconds can be varied by changing the value of resistor 404 and/or resistors 380 and 382, or by changing the value of capacitor 398 and/or resistor 408.

If solenoid contactor 30 should open after being closed, due for example to low voltage across solenoid coil 26, a lockout signal is developed. Assuming this condition of operation, capacitor 384 will have been charged to its maximum voltage. Pin 6 of comparator 364 now goes from battery voltage to near ground when contactor 30 opened. Accordingly, pin 6 has a lower voltage than pin 5 and pin 7 goes high. Pin 3 of comparator 362 now has a higher voltage than pin 2 and pin 1 switches high applying a lockout signal to shut-off circuit 122 which turns-off FETS 80. This sequence of events prevents solenoid contact chatter since the start switch must be opened and re-closed to re-engage the cranking motor.

The solenoid coil 26 has been shown and described as a single coil winding. This single coil can be replaced by two coil windings connected in parallel where the two coils are arranged to provide the same flux as a single coil winding. When two parallel connected coils are used, the coils can be wound like the pull-in and hold-in coils used on conventional cranking motors. The minimum resistance of a single coil or two parallel connected coils may be about 0.09 ohms in a 12 volt system.

The embodiments of the invention in which an exclusive property or privilege is claimed are defined as follows:

1. An electronic control system for an electric cranking motor comprising, a source of direct voltage, an electric cranking motor connected to drive a pinion that is adapted to be meshed with the ring gear of an engine to be cranked, a solenoid having a plunger and a coil, said coil when energized causing said plunger to be moved, said plunger connected to said pinion for moving said pinion into mesh with said ring gear, solenoid contact means operated by movement of said plunger, said contact means being closed when said coil is energized to connect said source of direct voltage and said cranking motor, means for connecting and disconnecting said solenoid coil to and from said source of direct voltage comprising a plurality of parallel connected field effect transistors, a start switch, means for causing said field effect transistors to be turned on when said start switch is closed, a voltage sensing means connected to sense the magnitude of the voltage of said source of direct voltage, said voltage sensing means including means for developing a signal when the magnitude of the voltage of said source of direct voltage is below a predetermined value, and means coupled to the gates of said field effect transistors and responsive to the development of said signal for turning off said field effect transistors.

2. The control system according to claim 1 where said voltage sensing means includes means for preventing said signal from being developed when short term voltages that go below said predetermined value are applied to said voltage sensing means.

3. The control system according to claim 1 which includes means for maintaining said field effect transistors turned off once they have been turned off by the development of said signal until said start switch is opened.

4. The control system according to claim 1 wherein said source of direct voltage has positive and negative terminals and wherein said solenoid coil is connected between the positive terminal and the drains of said field effect transistors, the sources of said field effect transistors being connected to the negative terminal of said source of direct voltage.

* * * * *